May 10, 1949.   P. C. CANTRELL   2,469,949
PIPE SUPPORT CLAMP
Filed Oct. 29, 1945   2 Sheets-Sheet 1
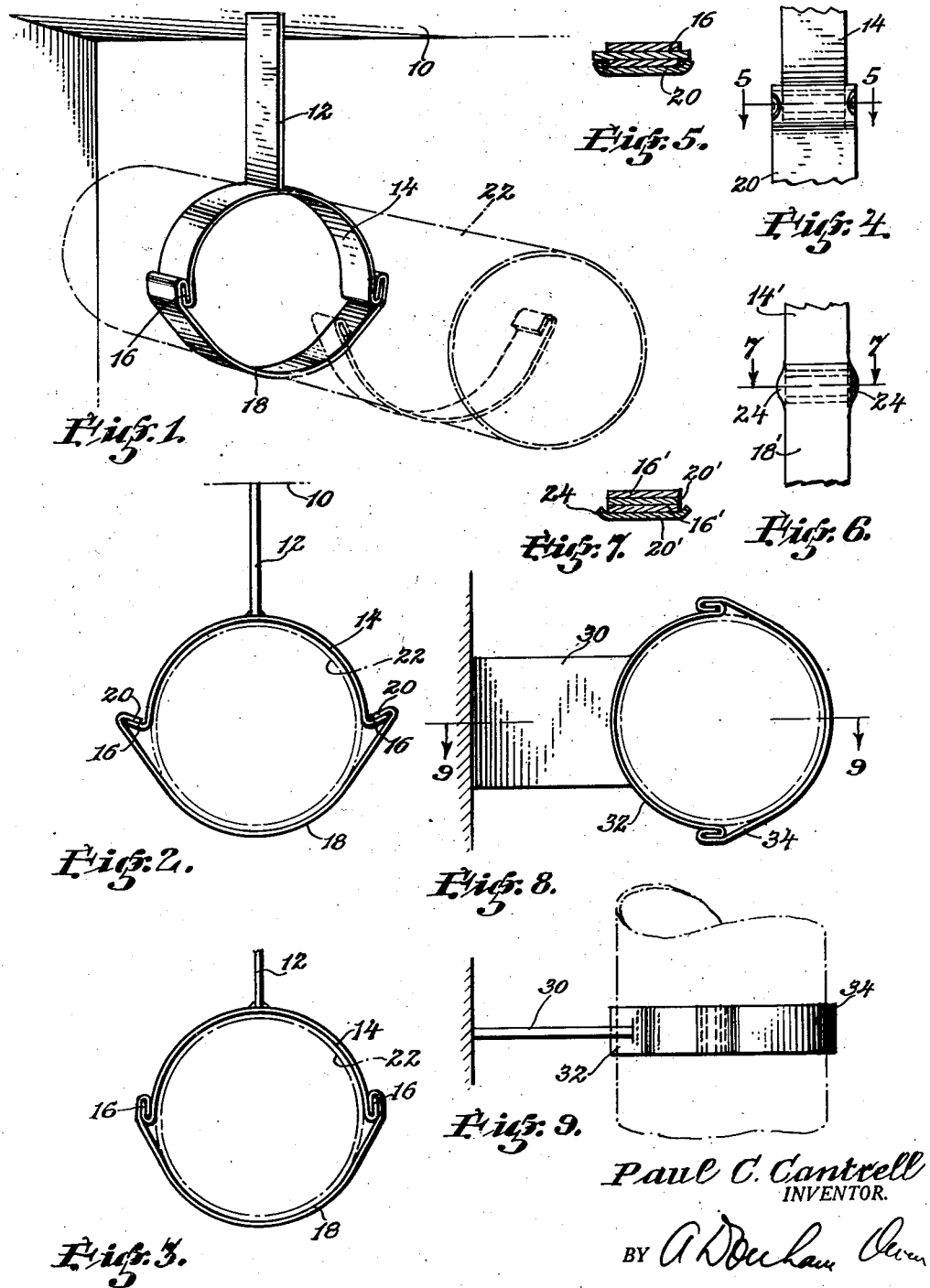
Paul C. Cantrell
INVENTOR.
BY A. Dunham Owen
ATTORNEYS.

Patented May 10, 1949

2,469,949

UNITED STATES PATENT OFFICE 2,469,949

PIPE SUPPORT CLAMP

Paul C. Cantrell, Berkeley, Calif.

Application October 29, 1945, Serial No. 625,199

3 Claims. (Cl. 248—58)

My invention relates to hangers and more particularly to a hanger for suspending a pipe or similar cylindrical object.

There are on the market various types of pipe hangers of varying degrees of complexity and cost. However, none of the hangers hitherto available have satisfactorily combined low cost, ease of assembly, and a firm, secure grip capable of clamping a pipe in place without rattling when installed in a ship or other location subject to vibration. The most important object of my invention is to produce a pipe hanger in which these advantages are obtained.

An important feature of my invention consists of a pair of curved metal bands provided at their ends with cooperating lips capable of being squeezed together to stretch the bands securely about a pipe and simultaneously to lock the bands securely in position.

These and other objects and features of my invention will be more readily understood and appreciated from the following detailed description of preferred embodiments thereof selected for purposes of illustration and shown in the accompanying drawing, in which:

Fig. 1 is a view in perspective of a hanger constructed according to my invention and shown gripping a pipe;

Fig. 2 is a view in end elevation showing a hanger partially assembled;

Fig. 3 is a view in end elevation showing the hanger in final assembled condition;

Fig. 4 is a view in side elevation of a portion of an assembled hanger;

Fig. 5 is a view in cross-section along the line 5—5 of Fig. 4;

Fig. 6 is a view in side elevation of a portion of another embodiment of the hanger of my invention;

Fig. 7 is a view in cross-section along the line 7—7 of Fig. 6;

Figs. 8 and 9 are views in end and side elevation respectively of a third embodiment of the invention.

Figure 10:
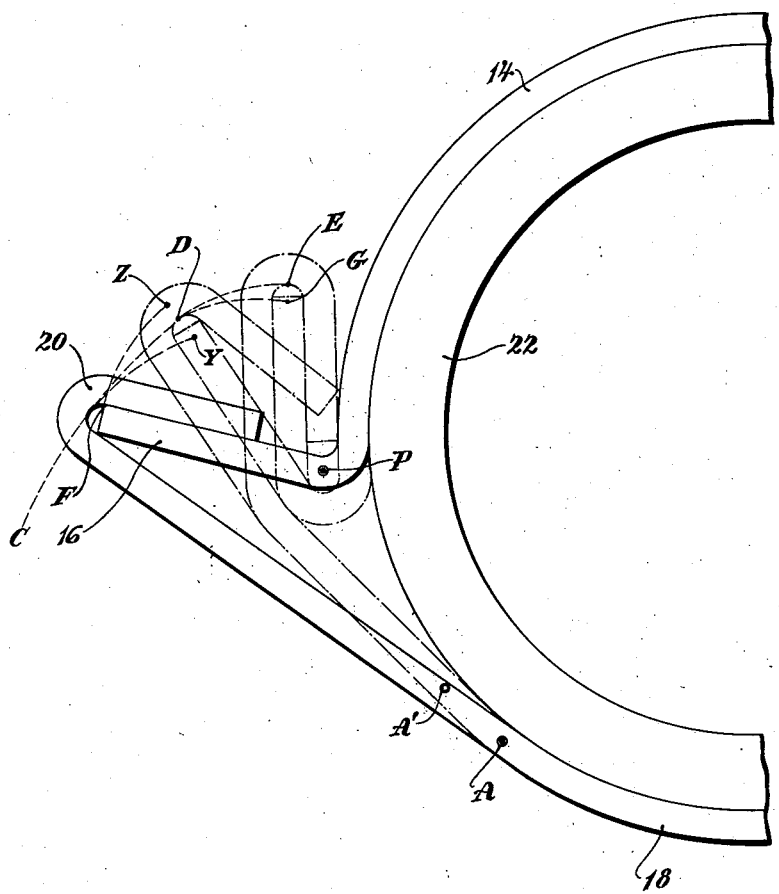
Fig. 10 is a diagrammatic view in end elevation showing the stretching action on the clamping bands.

In Fig. 1 there is suggested a corner of a room or compartment having a ceiling or overhead 10 in which is embedded or suitably fastened the upper end of a metal bar or support 12. Welded to the lower end of the support 12 is a metal band 14 of iron or steel which is malleable but also somewhat resilient. There are also many non-ferrous materials which are satisfactory and especially desirable for certain purposes such as bronze when exposed to salt water, aluminum where light weight is desired, and many others. The band 14 is a flat ribbon of light gauge stock bent to form a semi-circle and having its ends turned outwardly for about half an inch or so to form short projecting lips or flanges 16 as shown in Fig. 2.

A second band 18, of the same material as the band 14, has its central portion curved to form an arc of a circle with the same diameter as that of the band 14. The end portions of band 18 are relatively straight and substantially tangent to the central arc. The extreme ends are bent inwardly to form a pair of lips or flanges 20. The lips 20, or in fact the whole band 18, may be wider than the lips 16 of the band 14 in installations exposed to heavy vibration for the purpose of clinching band 18 in place.

When it is desired to suspend a pipe 22 (shown in dotted lines) from the ceiling 10, the pipe is held up against the band 14; then the band 18 is placed against the bottom of the pipe but displaced axially from the band 14 as shown by the dotted line portion of the band 18 in Fig. 1. Then the lower band 18 is slid axially along the pipe until the lips 20 overlie the lips 16 on the band 14. A hammer or mallet is then used to drive the cooperating lips inwardly and back against the outer surface of the band 14 where they are interlocked by frictional interengagement. It will be noted that the distance between the tops of the lips 20 along the band 18 is longer in the completely assembled position of Fig. 3 than it was in the partially assembled condition illustrated in Fig. 2. When the engaged lips are driven in, the lower band wraps hard around the pipe 22 and clamps it tightly against the upper band 14. The length of the bands is of course chosen to fit the diameter of the pipe used, and I contemplate the manufacture of hangers of many sizes to accommodate pipes or fixtures of various diameters.

The lips of the lower band 18, as stated, may preferably be wider than those of the upper band 14. As shown in Figs. 4 and 5 the margins of the lips 20 may be bent to overlap the lips 16 to prevent axial displacement of the bands. The bending may be conveniently accomplished by employing a drift or merely by using a peen hammer.

In Figs. 6 and 7 a hanger is shown which is made precisely as above described with the exception of the fact that the lips 20 are provided with integral tabs 24 arranged in opposition and adapted to be driven or bent inwardly to overlie the edges of the lips 16'. In this case the lower band 20' is of the same width as the upper band 14'.

In Figs. 8 and 9 I have shown a third embodiment of my invention in which a support 30 is formed as a relatively wide metal strap arranged parallel to an upper band 32 and welded thereto to form a stiffener and increase the rigidity of the whole hanger. A lower band 34 engages the upper band 32 in the same manner as in the embodiments described above. Support 30 may also be extended upwardly from a floor or pedestal for supporting pipe or fixtures.

In Fig. 10 there is shown diagrammatically the action undergone by the elements of a hanger constructed in accordance with my invention and installed about the end of a pipe 22. The pipe is held against the upper band 14 which is provided with an outwardly extending lip 16. Then a lower band 18 is slid axially until its inwardly turned lip 20 engages the lip 16. The bands are so dimensioned that a slight clearance is provided between the upper end of the lip 16 and the throat, or bight, of the lip 20. When the lips are forced inwardly, the lower band wraps around the periphery of the pipe 22, and the throat of the lip 20 travels along the path C—D representing rotation about a succession of axes extending from point A to point A'. If the travel of the lip 20 were not interfered with by the lip 16 the throat of the lip 20 would travel along a path C—Y. Similarly the end of the lip 16 would, if unimpeded, travel along a path F—Z. The actual paths followed by the lips are the result of the co-action of the two. The bands are stretched as the result of the cam action of their lips.

As the lips are forced further inwards they are further tensioned. The throat of the lip 20 travels from D to E, whereas unimpeded motion would have moved it from D to G. The distances D—Y and E—G represent the amount of stretch imparted to the lower band 18.

The upper lip 16 may be considered as rotating about the point P which would cause movement of the end along an arc F—Z were it not for the cam action of the lip 20. It is the stretching of the bands 14 and 18 which so securely clamps the pipe and maintains it in fixed position.

A hanger constructed in accordance with my invention is of very little cost, the assembly is a simple operation, and the grip on the pipe is firm and prevents chattering or rattling even when the installation is made in a location subject to vibration, such as the engine room of a ship, or attached to a structure supporting a vibrating load. The malleable metal of the bands is important because it permits the bands to assume permanently the set imparted to them when the lips are driven into interlocking position. However, the metal of the bands should possess some degree of resilience in order to provide a more efficient and constant clamping pressure on the pipe.

Having now described and illustrated preferred embodiments of my invention, I claim as new and desire to secure by Letters Patent of the United States:

1. A pipe hanger which comprises a support, a first resilient, semi-circular, metal band secured to said support, an outwardly turned lip disposed on each end of said band, a second resilient, semi-circular, metal band, and an inwardly turned lip disposed at each end of said second band, whereby the lips on said bands may be brought into locking engagement and then bent in toward the pipe to shorten the inner circumference of the joined bands from a length greater than the circumference of said pipe to a length slightly shorter than said circumference.

2. A hanger comprising a pair of curved resilient metal bands, the curves of said bands being dimensioned to form a complementary semicircle, and lips formed on each end of both bands and so disposed as to permit interlocking the lips of one band with those of the other and then bending the interlocked bands in toward the center to shorten the inner circumference of the hanger, the lips of one band being wider than those of the other, whereby the margins of said wide lips may be bent to overlap the edges of the lips of the other band.

3. A hanger comprising a pair of curved resilient metal bands, the curves of said bands being dimensioned to form a complementary semicircle, lips formed on each end of both bands and so disposed as to permit interlocking the lips of one band with those of the other and then bending the interlocked bands in toward the center to shorten the inner circumference of the hanger, and a pair of opposed tabs secured to the edges of the lips on one of said bands, whereby said tabs may be bent to overlap the edges of the interlocked lips of the other of said bands.

PAUL C. CANTRELL.

REFERENCES CITED

The following references are of record in the file of this patent:

UNITED STATES PATENTS

| Number | Name | Date |
|---|---|---|
| 801,409 | Smith | Oct. 10, 1905 |
| 1,126,845 | Overn et al. | Feb. 2, 1915 |
| 1,452,993 | Wack | Apr. 24, 1923 |